United States Patent [19]

Barshinger

[11] Patent Number: 5,049,864

[45] Date of Patent: * Sep. 17, 1991

[54] DISPLAY SCHEME FOR DECOMPRESSION DATA

[75] Inventor: Craig W. Barshinger, St. John, V.I.

[73] Assignee: Orca II, Inc., Wilmington, Del.

[ * ] Notice: The portion of the term of this patent subsequent to Nov. 1, 2005 has been disclaimed.

[21] Appl. No.: 420,621

[22] Filed: Oct. 10, 1989

Related U.S. Application Data

[63] Continuation of Ser. No. 219,015, Jul. 14, 1988, abandoned, which is a continuation of Ser. No. 786,723, Oct. 15, 1985, Pat. No. 4,782,338, which is a continuation of Ser. No. 648,797, Sep. 7, 1984, abandoned, which is a continuation of Ser. No. 341,281, Jan. 21, 1982, abandoned.

[51] Int. Cl.$^5$ .............................................. G09G 3/00
[52] U.S. Cl. ................................... 340/753; 340/754; 364/413.31; 405/186; 73/291; 73/300
[58] Field of Search ............... 340/716, 722, 752, 753, 340/754; 128/201.27, 205.23; 137/557; 364/413.31, 558; 405/186, 187; 73/291, 300, 32 R

[56] References Cited

U.S. PATENT DOCUMENTS 3,415,247 12/1968 Louvel et al. .
3,457,393 7/1969 Stubbs et al. .
3,594,554 7/1971 Pederson .
3,662,373 5/1972 Schumann .
3,681,585 8/1972 Todd .
3,696,610 10/1972 Charbonnier .
3,710,625 1/1973 Borom et al. .
3,746,850 7/1973 Moore .
3,759,109 9/1973 Johnson et al. .
3,835,465 9/1974 Tannas, Jr. et al. .
3,864,977 2/1975 Leeman .
3,872,731 3/1975 Borom et al. .
3,886,801 6/1975 Hills .
3,888,127 6/1975 Shamlian et al. .
3,910,117 10/1975 Wicklund .
3,919,888 11/1975 Muster et al. .
3,992,948 11/1976 D'Antonio et al. .

4,005,282 1/1977 Jennings .
4,054,783 10/1977 Seireg et al. .
4,107,995 8/1978 Ligman et al. .
4,109,140 8/1978 Etra .
4,188,825 2/1980 Farrar .
4,192,001 3/1980 Villa .

(List continued on next page.)

FOREIGN PATENT DOCUMENTS 2487070 1/1982 France .
2551564 3/1985 France .

OTHER PUBLICATIONS

"Future Electronic Instrumentation for Submersibles, Habitats and Divers," K. R. Haig, *The Radio and Electronic Engineer*, vol. 41, No. 5 (May, 1971) pp. 225–236.
"A Decompression Gauge for Divers," Gordon Groves and Walter Munk, *Univ. of California Scripps Institution of Oceanography*, (Dec. 10, 1953), SIO Ref. 53-64.

(List continued on next page.)

Primary Examiner—Alvin E. Oberley
Assistant Examiner—Richard Hjerpe
Attorney, Agent, or Firm—Panitch Schwarze Jacobs & Nadel

[57] ABSTRACT

Novel display scheme for decompression data is herein presented which can be animated by various types of decompression computers and permits the use of new, highly advantageous procedures in many aspects of diving, notably: (1) no-decompression diving, (2) decompression diving, and (3) repetitive diving. It allows a diver to choose his margin of safety, lending itself to use by divers predisposed to DCS, or by divers working under arduous conditions. It consists of graphical and digital display elements which accesses the contents of a microprocessor or other information source as to a diver's tissue's state of saturation with inert gas. This information is presented to a diver in a simple, straight forward and non-confusing manner which allows him-/or to use the new highly advantageous procedures.

10 Claims, 2 Drawing Sheets

U.S. PATENT DOCUMENTS

| | | |
|---|---|---|
| 4,286,265 | 8/1981 | Kauffman et al. . |
| 4,307,449 | 12/1981 | Strubin . |
| 4,320,484 | 3/1982 | Burdet . |
| 4,327,584 | 5/1982 | Alinari . |
| 4,336,591 | 6/1982 | Berdzar et al. . |
| 4,352,168 | 9/1982 | Anderson . |
| 4,400,977 | 8/1983 | Gross . |
| 4,466,285 | 8/1984 | Allemano . |
| 4,782,338 | 11/1988 | Barshinger ......................... 340/754 |

OTHER PUBLICATIONS

*The Physiology and Medicine of Diving*, 2d Ed, (edited by Bennett et al.), Williams and Wilkens Co. 1975—"Decompression Theory: American Practice," Workman et al., Chap. 17, pp. 307–314 and 326–330.

"Microcomputers Applied to Underwater Diving," *Canadian Electronics Engineering*, Sep. 1975.

"Digital Decompression Calculator," Canadian Thin Films Ltd. commercial brochure (2 pages).

"Digital Decompression Calculator," Canadian Thin Films Ltd. commercial brochure (1 page).

"The Diver's Edge," Bruce Bassett, Reprint from *Skin Diver*, (Jul. 1983).

"Decompression Theory," *The Seventeenth Undersea Medical Society Workshop*, Bethesda, Md, Sep. 6–7, 1978.

"A History of the Development of Decompression Tables," C. W. Schilling, M.D., *Undersea Medical Society, Inc.*, Bethesda, Md. (Jan. 10, 1981).

"Decompression in Depth," Proceedings of *Professional Association of Diving Instructors*, Santa Ana, California (Mar. 10, 1979).

"The Use of the Pneumatic Analogue Computer for Divers," D. J. Kidd and R. A. Stubbs, *Physiology and Medicine of Diving*, pp. 386–413.

DISPLAY SCHEME FOR DECOMPRESSION DATA

This is a continuation of U.S. application Ser. No. 219,015, filed July 14, 1988, now abandoned, which was a continuation of U.S. application Ser. No. 786,723 filed Oct. 15, 1985, now U.S. Pat. No. 4,782,338, which was a continuation of application Ser. No. 648,797 filed Sept. 7, 1984, now abandoned which was a continuation of U.S. application Ser. No. 341,281 filed Jan. 21, 1982, now abandoned.

A. FIELD OF THE INVENTION

This invention is a unique display scheme that allows information contained in certain types of decompression computers to be communicated under circumstances where such information was previously unavailable. This invention makes possible a substantially different and much refined procedure for decompression and for no-decompression diving.

B. PRIOR ART

Knowledge as to the amount of $N_2$ or inert gases in general dissolved in the fluids and tissues of the human body is of great importance in avoiding DSC (decompression sickness) or the "bends".

Various devices have been known which, using mathematical or analog simulators, attempt to track the $[N_2]$ changes which occur during the course of an underwater dive or any hyperbaric exposure. (U.S. Pat. Nos. 3,457,393; 3,681,585; 4,005,282; 4,054,783; 4,192,001).

According to man's present, incomplete understanding of the decompression phenomena, inert gases in the breathing mixture are taken up or released in a more or less exponential fashion whenever a disequilibrium exists between their concentration in body tissues and their concentration in the inspired gas. The half-times for this uptake vary with the particular body tissue or fluid. The number of "tissue compartments", as they are called, is unknown and in fact there may not exist discreet compartments. Present day decompression practices are based on the assumption that there are in the neighborhood of 6 tissue compartments controlling the duration of man's hyperbaric excursions.

Each tissue (of a half time in range of 5 to 200 minutes for example) is thought to be able to tolerate a certain level of supersaturation with inert gas without forming the small bubbles which cause DCS. This certain level is known as the M value. The object of decompression practice, whether it be guided by tables or computing devices, is to never exceed this permissible supersaturation for a given tissue. (It must be noted here that there exist other schools of thought concerning the matter of permissible supersaturation, but at present, decompression practices which give satisfactory results (within their limitations) are based on the theory outlined above.

Modern decompression computer may keep track of approximately 10 hypothetical tissues. The information they display, however, is generally restricted to (1) the current depth, and (2) the depth to which a diver can currently ascend without exceeding the permissible supersaturation of any one of the n tissues being monitored. There exist procedures wherein this information is used to safely attain the surface after completing his task or purpose underwater.

There is a great deal more information contained in the decompression computer than is displayed to the user. The reasons for this limited quantity of information displayed are, in part, that (1) it is not apparent of what value this further information would be to the diver in his effort to avoid DCS, (2) an excess of information may serve only to confuse a diver, increasing risk of diver error, and (3) displaying supplemental information via the standard digital technique is not possible without greatly enlarging the UDC, which is undesirable for a diver-carried device.

The present invention presents a solution to these three objections. It is greatly superior to present display schemes in allowing a diver to stay within his no-decompression limit (i.e. diving such that he can always ascend directly without having to stop or alter his ascent to de-gas). It also permits a refined decompression procedure to be followed, resulting in faster and safer total ascent time.

C. OBJECT OF THE INVENTION

It is an object of the invention to provide a diver-carried method of displaying information concerning a diver's state of saturation with inert gas so that he may more effectively avoid the bends.

It is a further object of the invention to provide this information in a simple, compact, straightforward, and non-confusing manner.

It is yet another object of the invention to provide a diver with information and a method for its interpretation which will enable a diver to optimize his dive profile for maximum usable time underwater.

It is a further object of the invention to give a diver an easily apprehended conception of his margin of safety, and to allow him easily to choose his margin of safety in accordance with the numerous factors such as fatique, obesity, etc. which predispose a diver to the bends.

It is another object of the invention to allow the optimization of the dive profile for no-decompression diving, a special interest of sport divers.

It is yet another object of the invention to permit a refined decompression procedure to be followed which results in a faster and safer total ascent time.

D. DESCRIPTION OF THE DRAWINGS

E. DETAILED DESCRIPTION OF THE INVENTION

Figure 1:
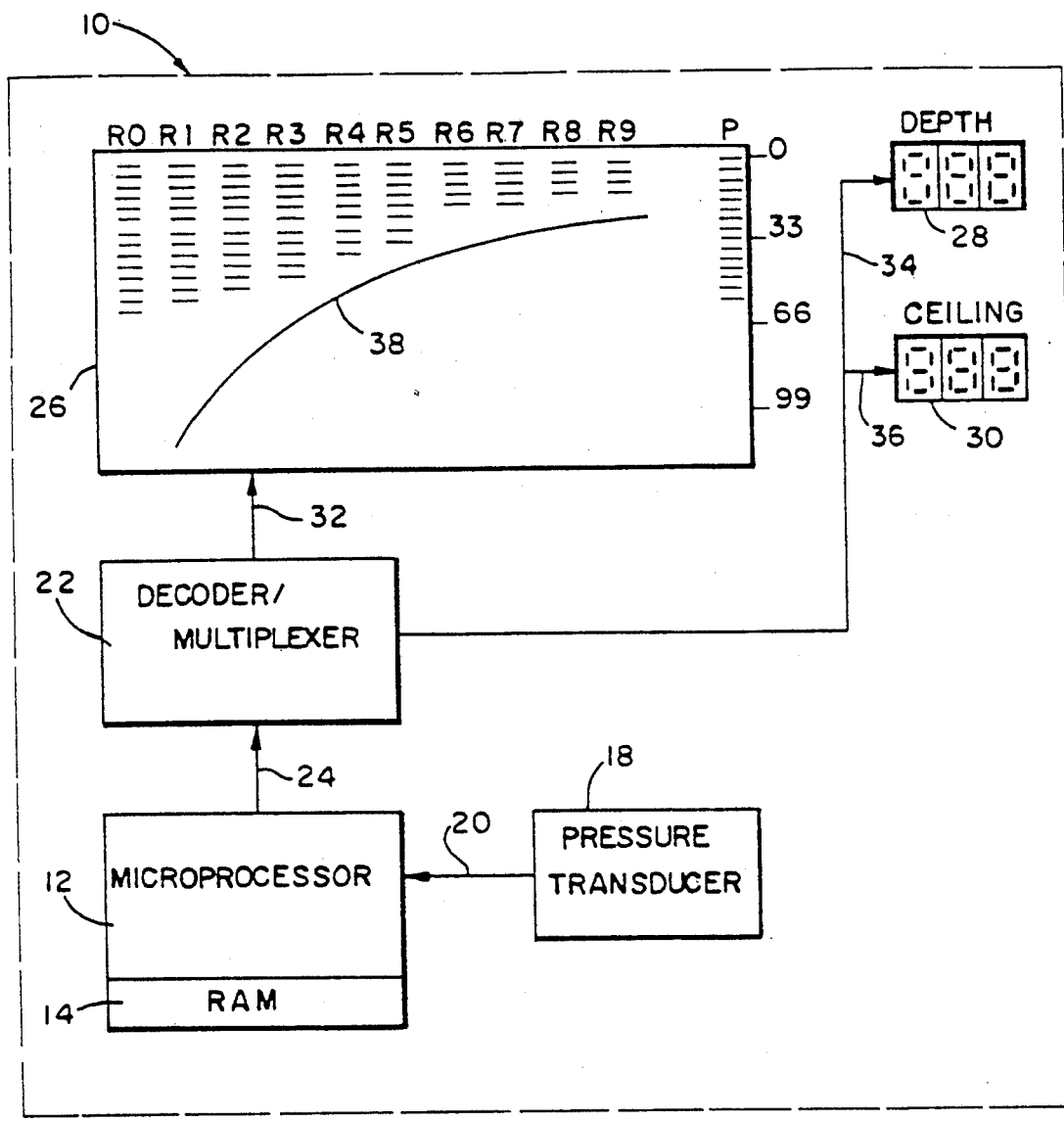
FIG. 1 depicts a preferred embodiment of the invention including LCD matrix, multiplexor and RAM storage in block diagram form.

In the preferred embodiment of this invention, the degrees of saturation with inert breathing gas in the body tissues are displayed graphically, and depth and ceiling are displayed digitally. The depth is displayed graphically between 0 and 99 f.s.w. (feet of seawater). The tissue pressures are also displayed as equivalent depth in f.s.w., arranged in order of ascending half-times. A curve traced on the display marks the corresponding M value for the tissues considered.

LEDs (FIG. 2) or a number of other media can be used to construct this display, but a multiplexed LCD matrix (FIG. 1) is advantageous because of high information density, long life, low cost, and low power consumption. The high information density LCD used in the preferred embodiment allows upward of ten tissues to be displayed. This reduces the display to a surface which advances or retreats from its origin (as the degrees of saturation in the n tissues varies). The changing profile of this surface and its spatial relation to the M value line communicates to a diver, at a glance, the status of the sum of his body tissues, and concurrently his needs for decompression. If any part of the surface is seen to cross the M line, the diver is in need of decompression. The ceiling depth will indicate what is the minimum depth to which he can safely ascend. At this ceiling depth, inert gas elimination will proceed at the maximum safe rate. A diver wishing to ascend in the minimum possible time would "hang" at the ceiling depth, continuously matching his depth to the ceiling, until the ceiling reaches 0 f.s.w. at which point he could exit the water. A diver who, for a number of reasons, might wish to add to his own safety margin, would decompress by initially ascending to a depth below the permissible ceiling, 10 feet for example, then continuously maintaining his depth at 10 feet below the ceiling. He can exit the water when the ceiling reaches 0 f.s.w.

The graphical portion of the display allows the diver to accurately estimate his required ascent time, because he can readily see which tissue group (a slowly equilibrating versus a quickly equilibrating) is responsible for his need for decompression.

In the preferred embodiment of the invention, when driven display segments extend beyond the M value line, these and all segment sections between these and the origin will flash continuously. This alerts the user of the need for decompression. Alternate embodiments include an audible alarm and colored indicator lights.

The effectiveness of the invention in conducting multilevel no-decompression diving is much greater than previously available:

The multitude of bars that make up the surface representing the body's nitrogen profile are constantly changing, each bar tending toward the current depth at its own (half-time) rate. No-decompression diving is accomplished by keeping all bars in the area between the origin and the M value line. To do this, the diver/user makes a simple comparison when a certain tissue group(s) nears the M value line. The tissue group in question will always tend toward the current depth, which is graphically displayed adjacently to the tissue groups. Thus the diver can control the position of the bar simply by changing his depth. In the case of no-decompression diving, he would move to a depth above the near-critical tissue pressure, causing the corresponding bar to retreat back toward the origin. Additionally, he knows what the response time will be for this retreat since fast half-time tissues equilibrate quickly and slow half-time tissues do so slowly.

The effectiveness of the invention in repetitive dive planning is much greater than previously available means: During a surface interval, the meter is left running. Thus prior to a repetitive dive a diver knows at a glance the status of all of his tissues and can accordingly choose an optional dive profile for the repetitive dive.

In addition to the above described methods of interpreting and using this invention, a user develops an "intuitive" understanding of it in familiarizing himself with this display scheme, which allows him to conceive further beneficial strategies of a subtler nature for its use.

The following description is presented with references to the accompanying figures to aid in its comprehension.

FIG. 1 illustrates a possible embodiment of a UDC, represented by microprocessor 12 with RAM storage 14, coupled with the novel display scheme. In this embodiment the display is composed of 3 liquid crystal components 26, 28 and 30, and a decoder/multiplexer 22. The three LC components 26, 28 and 30 may be integrated into a single device, or may stand separately. The three separate components shown 26, 28 and 30 are connected with the decoder/multiplexer 22 through lines 32, 34 and 36, respectively.

Ten RAMs (R0–R9) representing the amount of dissolved gas in body tissues are made available to the decoder by the microprocessor 12. This information may be in the form of an 8 digit binary number. Ten RAMs representing the status of R0–R9 with respect to the M value for that tissue are also made available to the decoder. As was previously indicated, a curve 38 on a display 26 marks the corresponding M values for the tissues considered. This information is in the form of a single bit, $S_n = 1$ for $R_n \geq M_n$, and $S_n = 0$ for $R_n < M_n$ (2). (In embodiments where more or fewer tissues are modeled by the microprocessor, there are correspondingly more or fewer RAMs $S_n$ and $R_n$).

A RAM, P, representing the current ambient pressure in terms of f.s.w. from a pressure transducer 18 coupled with the microprocessor 12 through line 20, and C, representing the ceiling depth, are also made available to the decoder as 8 bit numbers.

The elements R0–R9, S0–S9, P, and C are revised periodically, on the order of one second, by the microprocessor 12. At the end of each time period, the revised values are sent to the decoder/multiplexer 22 on line 24, which thus decodes, multiplexes and displays the information contained on these RAMs in the following manner:

P is displayed as an integer between 0 and 255 on a standard 3 digit, 7 segment LCD 28. C is likewise displayed on LCD 30.

P is additionally displayed on the graphical component 26 as are the values for R0–R9. Each of these 11 RAMs are allowed a track on the graphical component, extending vertically downward as depicted in FIG. 1. In the preferred embodiment, the tracks are composed of 99 segments to display depths/pressures of up to 99 feet. For more demanding diving, involving greater depths and exposure times, more segments allowing greater depths/tissue pressures may be utilized.

For example when R0 is binary 100001, equivalent to decimal 33, the track corresponding to R0 will display this fact by driving segments 1 through 33. When P=binary 1010101, decimal 85, the track corresponding to P will display the segments 1 through 85, and additionally the 3 digit 7 segment display will display "85". If P should exceed 99, this fact would be reflected by the 3 digit display. All 99 segments of the P track are driven at values were $P \geq 99$. When $R_n \geq M_n$ then $S_n = 1$ and all segments of the track corresponding to the $R_n$ blink continuously, informing the user of this state.

The display may also be constructed using commerically available dot matrices. This practice yields lower resolution; however, satisfactory resolution to convey the essential information intended by the invention can be obtained through the use of a 32×32 dot matrix 26' such as Crystalloid Electronics SX 402. This may be driven by a Hughes 32×32 LCD matrix decoder/driver 22' coupled with microprocessor 12' through 24'. RAM storage 14' representing R0-R9, S0-S9, P and C, and M value line 38' are also indicated. In this embodiment, scaling is necessary in order to allow 32 segments of track to represent 99 (or more) feet of depth. In such an embodiment a maximum of up to 31 tissues may be represented, leaving one track to depth and the adjacent track as a "spacer" to set off depth from tissue pressures. Matrices having lower resolving abilities are unadvisable since the "area" quality as well as the accuracy of the information displayed deteriorates with such coarser matrices. The waveforms to drive the display may be generated by the microprocessor 12' itself, instead of the external decoder/multiplexer 22 of FIG. 1.

Figure 2:
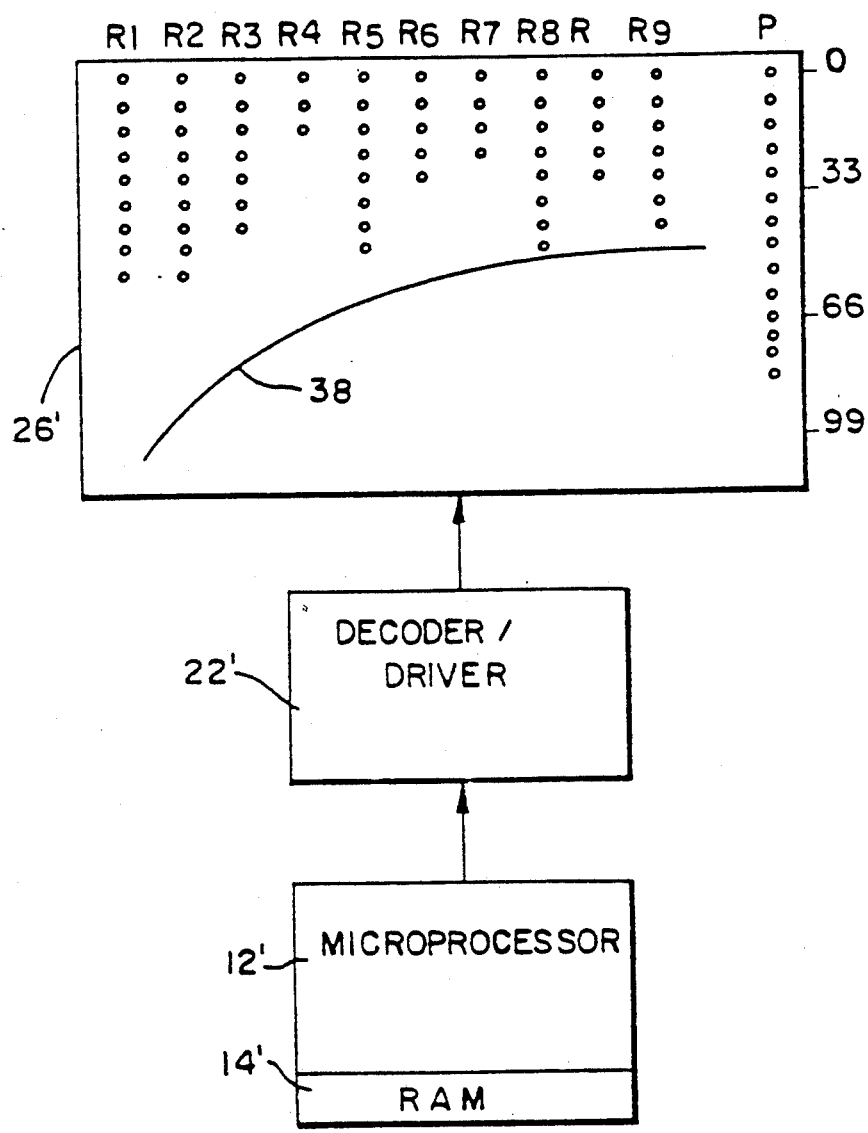
FIG. 2 depicts an alternative embodiment of the invention with dot matrix rows, decoder and RAM storage in block diagram form.

An alternate embodiment of the invention involves substituting an arrangement of LEDs for the LCD components of the preferred embodiment (FIG. 2). Such an embodiment has the advantage of high legibility underwater. Its higher energy consumption and lower information density relative to the LCD embodiments keep these latter the preferred forms of the invention.

Figure 3:
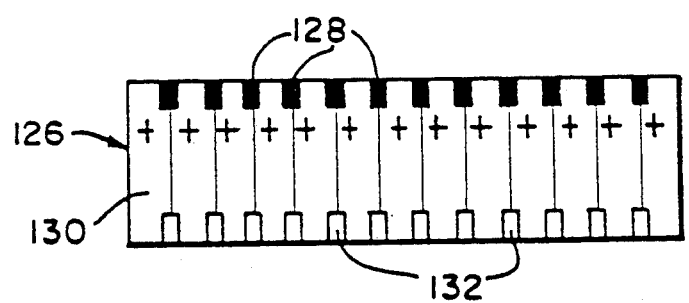
FIG. 3 depicts diagrammatically part of an LED display device.

An edge on view of a single track 126 of such an LED embodiment, with LED's 128 coupled through a conductive substrate 130 to electrical connectors 132 is shown in FIG. 3.

Another alternate embodiment of the invention is to construct the graphical and other display components using a Lisa (Light Switching Array). A Lisa's very low power consumption and non-volatility indicate its potential to replace LCD elements in the preferred embodiment.

Yet another embodiment of the invention may be constructed using an electrochromic display.

An alternate embodiment to the digital microprocessor embodiments thus far discussed is to construct the device using analog circuitry to generate voltages reflective of Rn and to either (1) convert these analog signals into digital signals for display, or (2) to construct a mechanical analog of the digital device such as ferromagnetic cursors moving in magnetic fields generated by the analog voltages.

Alternate embodiments of the graphical portion of the display may be constructed by passing it through a variety of geometrical transformations, such as inverting it, or bending it into a circle such that the origin is at the center and the bars radiate outward toward the circumference.

When more than one inert gas is used in the breathing mixture, an additional graphical component is needed for each additional inert gas in order to properly display the diver's decompression status.

This invention may also be used by divemasters or other diving support personnel monitoring a submerged diver with a suitable means of data transfer from diver to support crew.

GLOSSARY

Decompression Diving—The practice of planning diving excursions of such depth and durations that immediate ascent following completion of the working portion of the dive is not possible without risking the bends. This practice permits greater working time, but regulated ascent procedures must be followed to allow adequate de-gassing prior to surfacing.

No-Decompression Diving—The practice of planning diving excursions of such depths and durations that ascent to the surface may be made at any time during the dive. The form of diving most often practiced by sport divers.

Dive Profile—A diver's depth versus time during the course of a dive.

Ceiling—The shallowest depth to which a diver may safely ascend without over-supersaturation occuring in any tissue.

M Value—A tissue's coefficient of that same tissue's permissible supersaturation with an inert gas.

Repetitive Dive—Any dive made within 12 hours of a previous dive. (After 12 hours the body is considered to have completely lost any excess inert gas.)

The possible embodiments of the invention are given for illustrative purposes only, and it is understood that the invention may be practiced in other forms without departing from its true spirit. Thus the invention should be limited only by the language of the following claims.

What is claimed is:

1. A portable device for displaying decompression data comprising:
   a pressure sensor for sensing ambient pressure and for generating a signal representative of the sensed pressure;
   a programmed computer for receiving pressure signals from the pressure sensor and for periodically generating data representative of the level of dissolved gases in each of a plurality of tissue models having differing saturation half-times;
   memory means for periodically receiving and storing the dissolved gas level data for each of the tissue models and information concerning a predetermined dissolved gas level limit for each of the tissues modeled; and
   display means, including a graphic display device for receiving and simultaneously displaying the dissolved gas level data for one of the tissue models and the predetermined dissolved gas level limit information for the displayed tissue model.

2. The device as recited in claim 1 wherein the display means permits the user to gauge the maximum allowable rate at which the ambient pressure may be reduced without the dissolved gas level of the displayed tissue model exceeding its dissolved gas level limit.

3. The device as recited in claim 1 wherein the displayed tissue model the tissue model having a dissolved gas level which at the existing ambient pressure will exceed its corresponding dissolved gas level limit in the shortest time period.

4. The device as recited in claim 3 wherein the programmed computer determines the time remaining until the dissolved gas level of the displayed tissue model exceeds its corresponding dissolved gas level limit at the ambient pressure and the display means receives and displays the determined time.

5. The device as recited in claim 1 wherein the dissolved gas level limit for each tissue model is the maximum level of gases which may be dissolved in the particular tissue to permit movement to surface pressure without the need for decompression.

6. The device as recited in claim 1 wherein the dissolved gas level limit for each tissue is the tissue's M value.

7. The device as recited in claim 1 wherein the display means identifies the tissue model being displayed to permit a user to estimate the rate of change of the dissolved gas level for the displayed tissue model.

8. A portable device for displaying decompression data comprising data generation means for generating dissolved gas level data for a tissue model and graphic display means for receiving and simultaneously displaying an indication of the level of dissolved gases in a tissue model and a predetermined dissolved gas level limit for the displayed tissue model to permit the user to gauge the allowable rate at which ambient pressure may be reduced without the dissolved gas level for the displayed tissue model exceeding the dissolved gas level limit.

9. A method to be used by a diver for determining decompression information from a graphic display device which simultaneously displays the level of dissolved gases in tissue model and a predetermined dissolved gas level limit for the tissue model displayed, comprising periodically observing the relationship between the dissolved gas level for the displayed tissue model and its dissolved gas level limit to determine whether the dissolved gas level for the displayed tissue model has exceeded its dissolved gas level limit and, if not, observing the rate at which the dissolved gas level for the displayed tissue model is approaching its dissolved gas level limit to establish the time remaining until decompression is required.

10. A portable device for displaying decompression data comprising graphic display means for receiving and simultaneously displaying an indication of the level of dissolved gases in tissue model and a predetermined dissolved gas level limit for the displayed tissue model to permit the user to gauge the allowable rate at which ambient pressure may be reduced without the dissolved gas level for the displayed tissue model exceeding the dissolved gas level limit.

* * * * *